US011716635B2

(12) United States Patent
Li

(10) Patent No.: US 11,716,635 B2
(45) Date of Patent: Aug. 1, 2023

(54) CREATING PROTOCOL DATA UNIT FOR EARLY DATA TRANSMISSION

(71) Applicant: NOKIA TECHNOLOGIES OY, Espoo (FI)

(72) Inventor: Haitao Li, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 106 days.

(21) Appl. No.: 17/045,310

(22) PCT Filed: Apr. 5, 2018

(86) PCT No.: PCT/CN2018/082071
§ 371 (c)(1),
(2) Date: Oct. 5, 2020

(87) PCT Pub. No.: WO2019/192012
PCT Pub. Date: Oct. 10, 2019

(65) Prior Publication Data
US 2021/0153032 A1 May 20, 2021

(51) Int. Cl.
*H04W 16/18* (2009.01)
*H04L 1/08* (2006.01)
(Continued)

(52) U.S. Cl.
CPC .............. *H04W 16/18* (2013.01); *H04L 1/08* (2013.01); *H04W 28/06* (2013.01); *H04W 74/0833* (2013.01)

(58) Field of Classification Search
CPC ........ H04L 1/08; H04W 16/18; H04W 28/06; H04W 74/0833
(Continued)

(56) References Cited

U.S. PATENT DOCUMENTS

2018/0097599 A1* 4/2018 Lee .................... H04W 72/042
2018/0359786 A1* 12/2018 Phuyal .............. H04W 74/0833
(Continued)

FOREIGN PATENT DOCUMENTS

CN 104427459 A 3/2015
CN 105992372 A 10/2016
(Continued)

OTHER PUBLICATIONS

Extended European Search Report dated Nov. 8, 2021 corresponding to European Patent Application No. 18913298.8.
(Continued)

*Primary Examiner* — Rownak Islam
(74) *Attorney, Agent, or Firm* — Squire Patton Boggs (US) LLP

(57) ABSTRACT

Various communication systems may benefit from improved random access procedures. For example, it may be helpful to improve random access procedure when changing a coverage enhancement level. A method, according to certain embodiments, may include changing a coverage enhancement level in response to a failure of a random access procedure. The method may also include determining whether early data transmission may be initiated in the changed coverage enhancement level. In addition, the method may include building at a user equipment a protocol data unit corresponding to the changed coverage enhancement level when the early data transmission is initiated in the changed coverage enhancement level. Further, the method may include transmitting the early data from the user equipment to a network entity in the built packet data unit on the changed coverage enhanced level.

23 Claims, 2 Drawing Sheets

(51) Int. Cl.
*H04W 28/06* (2009.01)
*H04W 74/08* (2009.01)
(58) Field of Classification Search
USPC .......................................................... 370/329
See application file for complete search history.

(56) References Cited

U.S. PATENT DOCUMENTS

2019/0104553 A1* 4/2019 Johansson ......... H04W 74/0833
2019/0349892 A1* 11/2019 Rico Alvarino ........ H04W 8/22
2020/0187245 A1* 6/2020 Fujishiro ........... H04W 52/0229

FOREIGN PATENT DOCUMENTS

EP           3226644 A1   10/2017
WO   WO 2016/167570 A1   10/2016
WO   WO 2017/179814 A1   10/2017

OTHER PUBLICATIONS

ZTE et al., "On early data transmission for eMTC," 3GPP Draft, R1-1801619, 3GPP TSG RAN WG1 Meeting #92, Athens, Greece, Feb. 17, 2018, XP051397638.

MediaTek Inc., "Early Data Transmission TBS Determination," 3GPP Daft, R2-1802603, 3GPP TSG RAN WG2 Meeting #101, Athens, Greece, Feb. 15, 2018, XP051399872.

Notice of Preliminary Rejection dated Nov. 1, 2021 corresponding to Korean Patent Application No. 2020-7031952 with English summary thereof.

ZTE et al, "Impacts on PRACH procedure of CEL-based access barring," 3GPP Draft, R2-1802160, 3GPP TSG-RAN WG2 Meeting #101, Athens, Greece, Feb. 15, 2018.

Qualcomm Incorporated, "Email discussion report: [99#45][NB-IoT/MTC] Early data transmission," 3GPP Draft, R2-1710888, 3GPP TSG-RAN WG2 Meeting #99bis, Prague, Czechia, Sep. 28, 2017.

International Search Report and Written Opinion dated Dec. 29, 2018 corresponding to International Patent Application No. PCT/CN2018/082071.

First Examination Report dated Dec. 6, 2021 corresponding to Indian Patent Application No. 202047045504.

Non-Final Notice of Reasons for Rejection dated Nov. 30, 2021 corresponding to Japanese Patent Application No. 202-554420, with English summary thereof.

Ericsson, "Remaining general aspects of early data transmission," R2-1713054, 3GPP TSG-RAN WG2 #100, Reno, Nevada, USA, Nov. 27-Dec. 1, 2017.

Ericsson, "Report on [100#38][MTC/NB-IoT] Padding issue in Msg3," R2-1803077, 3GPP TSG-RAN WG2 #101, Athens, Greece, Feb. 26-Mar. 2, 2018.

Media Tek Inc., "On NB-IoT EDT indication via PRACH," R1-1719592, 3GPP TSG RAN WG1 Meeting #91, Reno, Nevada, USA, Nov. 27-Dec. 1, 2017.

ZTE, "Further consideration on early data transmission in eFeMTC and FeNB-IoT," R2-1710987, 3GPP TSG-RAN WG2 Meeting #99, Prague, Czech, Oct. 9-13, 2017.

Notice of Final Rejection dated Sep. 27, 2022 corresponding to Korean Patent Application No. 2020-7031952, with English summary thereof.

Final Notice of Reasons for Rejection dated Jun. 14, 2022 corresponding to Japanese Patent Application No. 2020-554420, with English summary thereof.

Huawei et al., "MAC-RRC modelling and fallback scenarios for EDT," 3GPP Draft; R2-1802219, 3GPP TSG-RAN WG2 Meeting #101, Athens, Greece, Feb. 26-Mar. 2, 2018, Feb. 15, 2018.

\* cited by examiner

CREATING PROTOCOL DATA UNIT FOR EARLY DATA TRANSMISSION

BACKGROUND

Field

Various communication systems may benefit from improved random access procedures. For example, it may be helpful to improve random access procedures when changing a coverage enhancement level.

Description of the Related Art

Third Generation Partnership Project (3GPP) technology, such as Internet of Things (IoT), has been developed to allow for the exchange of small data transmissions between a massive network of physical device, vehicles, home appliances, and other items. In particular, the IoT network allows for items embedded with electronics, sensors, and/or actuators to communicate with each another, and with other existing 3GPP technologies, such as Long Term Evolution (LTE) or LTE-Advanced (LTE-A). Narrowband IoT (NB-IoT) is a cellular technology that has been developed to provide wide-area coverage for IoT. NB-IoT provides for deployment flexibility, low device complexity, long battery lifetime, support of massive number of devices in a cell, and/or significant coverage extension beyond existing cellular technologies.

One of the goals of NB-IoT is to reduce the amount of signaling needed for transmission of uplink or downlink small data. To do so, support for early data transmission on a dedicated resource during a random access procedure is allowed. The early data transmission allows for transmission of downlink and/or uplink data after transmission of a narrowband physical resource access channel and before the radio resource connection (RRC) is complete. The user equipment can therefore initiate early data transmission as part of a message 3 (Msg3) in the random access procedure towards the network without first establishing the RRC connection.

For NB-IoT technology, random access procedures allow a user equipment to try increase coverage levels. Four coverage enhancement (CE) levels correspond to different coverage may be provided, and the user equipment can determine a CE level, for example, based on the serving cell's Reference Signal Received Power (RSRP) measurement and broadcasted RSRP threshold for different CE levels. Each of the CE levels has associated time and frequency resources to be used by the user equipment for random access preamble transmissions. When the user equipment fails random access after one or more attempts in a given CE level, the user equipment may consider itself to be in the next CE level and reattempts random access procedures until the user equipment reaches a maximum number of allowed attempts or successfully established the RRC.

SUMMARY

According to certain embodiments, an apparatus may include at least one memory including computer program code, and at least one processor. The at least one memory and the computer program code may be configured, with the at least one processor, to cause the apparatus at least to change a coverage enhancement level in response to a failure of a radio access procedure. The at least one memory and the computer program code may also be configured, with the at least one processor, to cause the apparatus at least to determine whether early data transmission may be initiated in the changed coverage enhancement level. In addition, the at least one memory and the computer program code may be configured, with the at least one processor, to cause the apparatus at least to build a protocol data unit corresponding to the changed coverage enhancement level when the early data transmission is initiated in the changed coverage enhancement level. Further, the at least one memory and the computer program code may also be configured, with the at least one processor, to cause the apparatus at least to transmit the early data to a network entity in the built packet data unit on the changed coverage enhanced level.

A method, according to certain embodiments, may include changing a coverage enhancement level in response to a failure of a random access procedure. The method may also include determining whether early data transmission may be initiated in the changed coverage enhancement level. In addition, the method may include building at a user equipment a protocol data unit corresponding to the changed coverage enhancement level when the early data transmission is initiated in the changed coverage enhancement level. Further, the method may include transmitting the early data from the user equipment to a network entity in the built packet data unit on the changed coverage enhanced level.

An apparatus, in certain embodiments, may include means for changing a coverage enhancement level in response to a failure of a random access procedure. The apparatus may also include means for determining whether early data transmission may be initiated in the changed coverage enhancement level. In addition, the apparatus may include building a protocol data unit corresponding to the changed coverage enhancement level when the early data transmission is initiated in the changed coverage enhancement level. Further, the apparatus may include means for transmitting the early data to a network entity in the built packet data unit on the changed coverage enhanced level.

According to certain embodiments, a non-transitory computer-readable medium encoding instructions that, when executed in hardware, perform a process. The process may include changing a coverage enhancement level in response to a failure of a random access procedure. The process may also include determining whether early data transmission may be initiated in the changed coverage enhancement level. In addition, the process may include building at a user equipment a protocol data unit corresponding to the changed coverage enhancement level when the early data transmission is initiated in the changed coverage enhancement level. Further, the process may include transmitting the early data from the user equipment to a network entity in the built packet data unit on the changed coverage enhanced level.

According to certain other embodiments, a computer program product may encode instructions for performing a process. The process may include changing a coverage enhancement level in response to a failure of a random access procedure. The process may also include determining whether early data transmission may be initiated in the changed coverage enhancement level. In addition, the process may include building at a user equipment a protocol data unit corresponding to the changed coverage enhancement level when the early data transmission is initiated in the changed coverage enhancement level. Further, the process may include transmitting the early data from the user equipment to a network entity in the built packet data unit on the changed coverage enhanced level.

BRIEF DESCRIPTION OF THE DRAWINGS

For proper understanding of the invention, reference should be made to the accompanying drawings, wherein.

DETAILED DESCRIPTION

In certain embodiments, a failed random access procedure may be re-attempted one or more times. The failure, for example, may be caused by a failure to receive a Random Access Response (RAR) or a contention resolution failure. When a random access failure occurs, data included in a Msg3 as part of an early data transmission may not be successfully transmitted. The user equipment may then perform a new preamble transmission, also known as message 1 (Msg1), and attempt to retransmit Msg3 from a buffer at the user equipment. The buffer may include or store a Msg3 protocol data unit (PDU) that includes data meant for early transmission. In some embodiments, however, the user equipment may be unable to retransmit the stored Msg3 PDU. In particular, changing the CE level may change the uplink grant to the user equipment, thereby causing the stored Msg3 PDU to no longer fit within the Msg3 uplink grant corresponding to the changed CE level.

In legacy NB-IoT procedures, the network provides an uplink grant to the user equipment that is based on a Transport Block Size (TBS) of 88 bits. In some embodiments, 8 bits may equal 1 byte. For early data transmissions, however, which include the transmission of small data as part of the Msg3 transmission, the uplink grant may be larger than 88 bits. For example, the TBS may range from 320 bits to 1000 bits. A network entity may provide different maximum TBSs for different CE levels. In some embodiments, the different maximum TBSs may be included as part of a broadcasting signaling transmitted from the network entity. For purpose of reducing the number of padding bits, a user equipment (UE) may choose a smaller TBS than the granted maximum size broadcasted by the network entity.

When the UE changes the CE level when reattempting random access procedures, in certain embodiments the TBS may not be the same as the initial or original uplink TBS granted during the initial random access procedure attempt. Some embodiments, therefore, help to facilitate Msg3 retransmission when the stored PDU located at a buffer may no longer fit the newly selected UL grant associated with the changed CE level.

Figure 1:
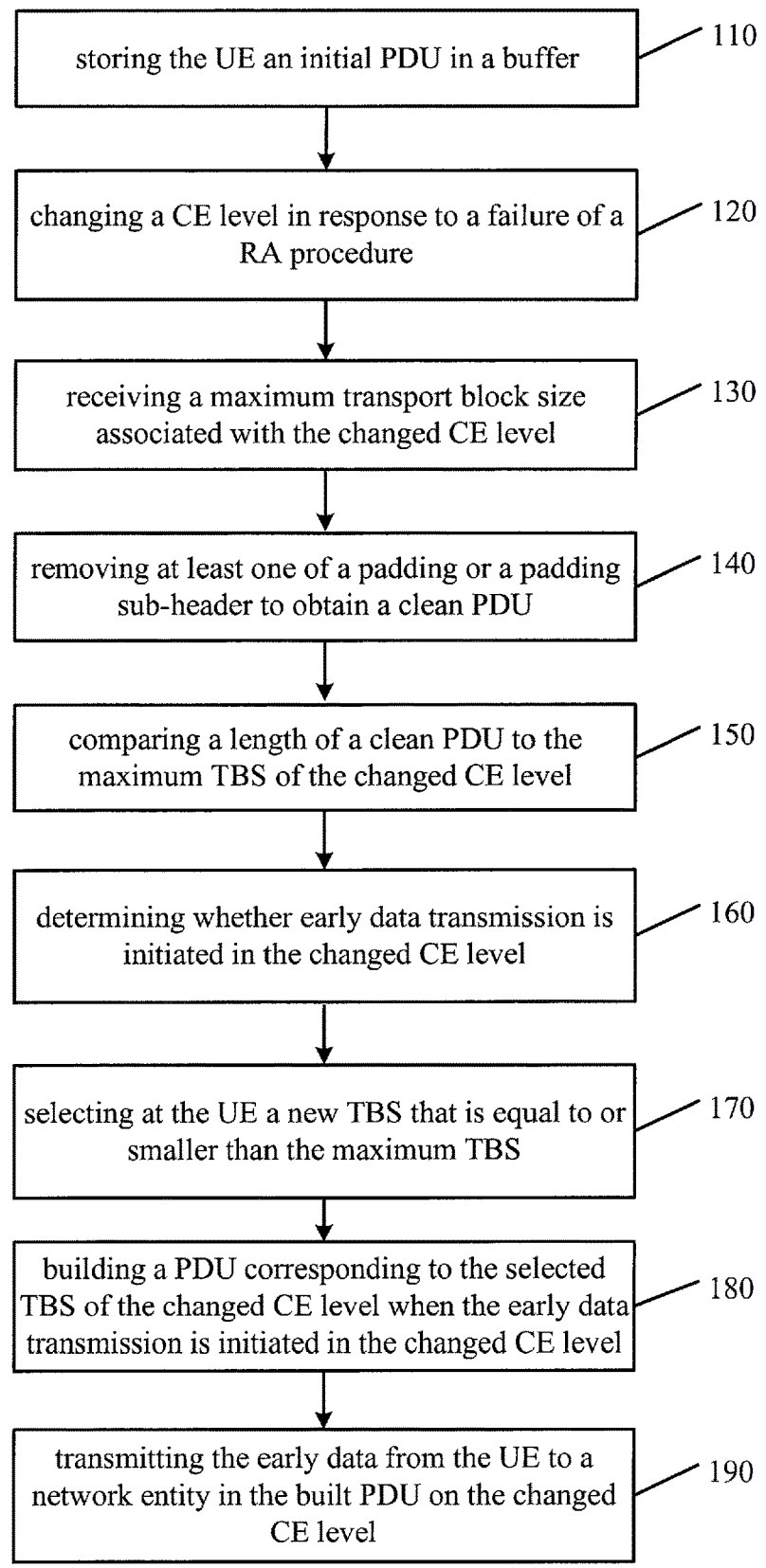
FIG. 1 illustrates an example of a flow diagram according to certain embodiments.

FIG. 1 illustrates an example of a flow diagram according to certain embodiments. In particular, FIG. 1 illustrates an example of a method performed by a UE, such as an IoT device. As part of a random access procedure, the UE may receive an initial uplink grant from the network entity. The uplink grant includes an initial PDU having a given TBS. For example, the PDU may be a medium access control (MAC) PDU. In step 110, the UE may store the initial PDU in a transmit buffer. The buffer may be stored in either a removable or a non-removable memory of the UE. The initial PDU may be for transmission by the UE to the network entity. The storing of the initial PDU in a buffer may occur, for example, after the UE transmits a Msg3 that includes the initial PDU as part of a random access procedures. In some other embodiments, the UE may also store a service data unit (SDU) and/or a MAC Control Element (CE) in additional to the initial PDU. The SDU may be located at a higher protocol layer than a PDU, and the SDU may be converted to a PDU using, for example, encapsulation.

In step 120, the UE may change a CE level in response to a failure of a random access procedure in a certain CE level. For example, a random access failure may occur on a first CE level, at which point the UE may attempt to change the CE level to a second CE level and reattempt random access. The UE may be informed of the failure via the reception of a random access response from the network entity, or a lack thereof. In step 130, the UE may receive a maximum TBS associated with the changed CE level. The maximum TBS associated with the changed CE level may be broadcasted from a network entity to one or more UEs. In some embodiments, the maximum TBS associated with the changed CE level, as shown in step 130, may be received before the changing of the CE level, as shown in step 120. In step 140, the UE may remove at least one of a padding or a padding sub-header from the stored initial PDU to obtain a clean PDU. Removing the padding may involve removing one or more filler bits in the PDU, thereby reducing the size of the PDU. In certain embodiments, the clean PDU may be obtained by removing at least one of a padding or a padding sub-header of the initial PDU.

In step 150, the UE may compare a length of the clean PDU and the maximum TBS corresponding to the changed CE level, as received by the UE in step 130. In certain embodiments the UE may initiate the early data transmission when the clean PDU is smaller than or equal to the maximum TBS corresponding to the changed CE level. In other embodiments, the UE may transmit the PDU stored in the buffer after the random access procedure is complete when the clean PDU is larger than the maximum TBS corresponding to the changed CE level. In other words, in embodiments in which the clean PDU length is larger than the maximum TBS size, the UE may start random access procedures without utilizing early data transmissions. On the other hand, when the clean PDU length is small than or equal to the maximum TBS size, the UE may reattempt random access procedures with early data transmissions.

In step 170, the UE may select a new TBS from a list of flexible TBSs allowed by the uplink grant provided by the network entity according to the clean PDU length. The list of TBS allowed by the uplink grant may correspond to a given CE level, and may include one or more TBSs from which the UE may select. In other words, each CE level may be associated with a list of allowable TBSs.

In some embodiments, the UE may select a new TBS for early data transmission that is equal to or small than the maximum transport block size corresponding to the changed CE level, and that is larger than or equal to the clean PDU, as shown in step 170. In other words, the amount of early data transmitted may be smaller than the selected TBS. Among the flexible TBS, for example, the UE may select a TBS size that is larger than the clean PDU length, but is the smallest possible TBS size that fits the PDU length. Choosing the smallest possible TBS size may allow for the minimization of padding. For example, if the amount of user data to be transmitted as the early data, as part of a Msg3, is 600 bits, and the list of possible TBSs corresponding to the CE level includes 320, 550, 750, and 1000 bits, the UE may select a TBS size of 750 bits. The selection of 750 bits may represent the smallest possible TBS size that fits the clean PDU length. In step 180, the UE may build a PDU corresponding to selected TBS of the changed CE level when the early data transmission is initiated in the changed CE level. The determination to initiate the building of the PDU, for example, may comprise adding one or more bytes to the clean PDU for padding or padding subheader.

In some other embodiments, the user equipment may store an initial SDU and corresponding control elements in a transmit buffer. The initial SDU and the corresponding control elements may be transmitted by the UE to the network entity. The building of the PDU, as shown in step 180, for example, may include adding one or more bytes to the initial SDU and the corresponding control elements for padding or padding subheader. In step 190, the UE may transmit the early data to a network entity in the built PDU on the changed CE level. The transmitting of the early data may be a retransmission.

In certain embodiments, when the selected TBS size is equal to the clean PDU length, no padding or padding header may be added. In other words, when the clean MAC PDU length is equal to the size of the selected TBS, no padding and padding headers may be added. In some other embodiments, in which padding of one or two bytes may be required, the built PDU may be created by placing one or two MAC subheaders for padding in the beginning and/or the end of the clean PDU. For example, when the selected TBS is larger than the clean MAC PDU length by one byte or two bytes, certain embodiment may add one or two padding subheaders, without adding padding bits. The building of the PDU may therefore include adding one or two bytes as headers or subheaders for padding. In other embodiments in which more than two bytes for padding are used, the UE may add padding and padding related MAC subheaders as part of the built PDU.

One example of the embodiments shown in FIG. 1 may be a UE undergoing early data transmissions in a CE level-1. The maximum TBS broadcasted for the current CE level-1 may be 1000 bits, while the list of allowed flexible TBS may be 320, 550, 750, and 1000 bits. When the user data transmitted during early data transmission is 600 bits, the UE may select the flexible TBS size of 750 bits in the uplink grant to build or create the PDU for Msg3 transmissions. The 750 bit PDU may be stored in a buffer of the UE. The Msg3 may be transmitted, at which point the random access procedures fail, for example, due to contention resolution failure. After a few random access failures in the CE level-1, the UE may move to CE level-2 for further random access attempts.

The broadcasted maximum TBS size for CE level-2 may be 700 bits, which is smaller than the 1000 bit maximum of CE level-1. The list of allowed flexible TBS for CE level-2 may be 320, 450, 550, and 700. The UE may select the 700 bits TBS, and attempt to transmit early state transmissions for 600 bits of user data using the uplink grant of 700 bits. The initial PDU, however, that is stored in the Msg3 buffer has a size of 750 bits, meaning that the initial PDU can no longer be transmitted in the new uplink grant for CE level-2, which has a size of 700 bits. UE can therefore build or re-build a PDU that corresponds and fits to the changed CE level, specifically to the 700 bit uplink grant of the PDU. As discussed above, each time the UE transmits the Msg3 including the PDU, such as a MAC PDU, the UE may store the MAC PDU, the MAC SDU, or the MAC CEs in a buffer. When the UE does not change CE levels, the uplink grant in the random access response and the TBS size remain the same for Msg3 retransmission. In such embodiments, the UE may simply obtain the MAC PDU from the buffer for Msg3 retransmission. In other embodiments, however, in which the CE level is changed, the UE may obtain the stored initial SDU plus the MAC CEs or PDU, and use the SDU plus MAC CEs or PDU to re-build the PDU according to the TBS corresponding to the changed CE level.

Figure 2:
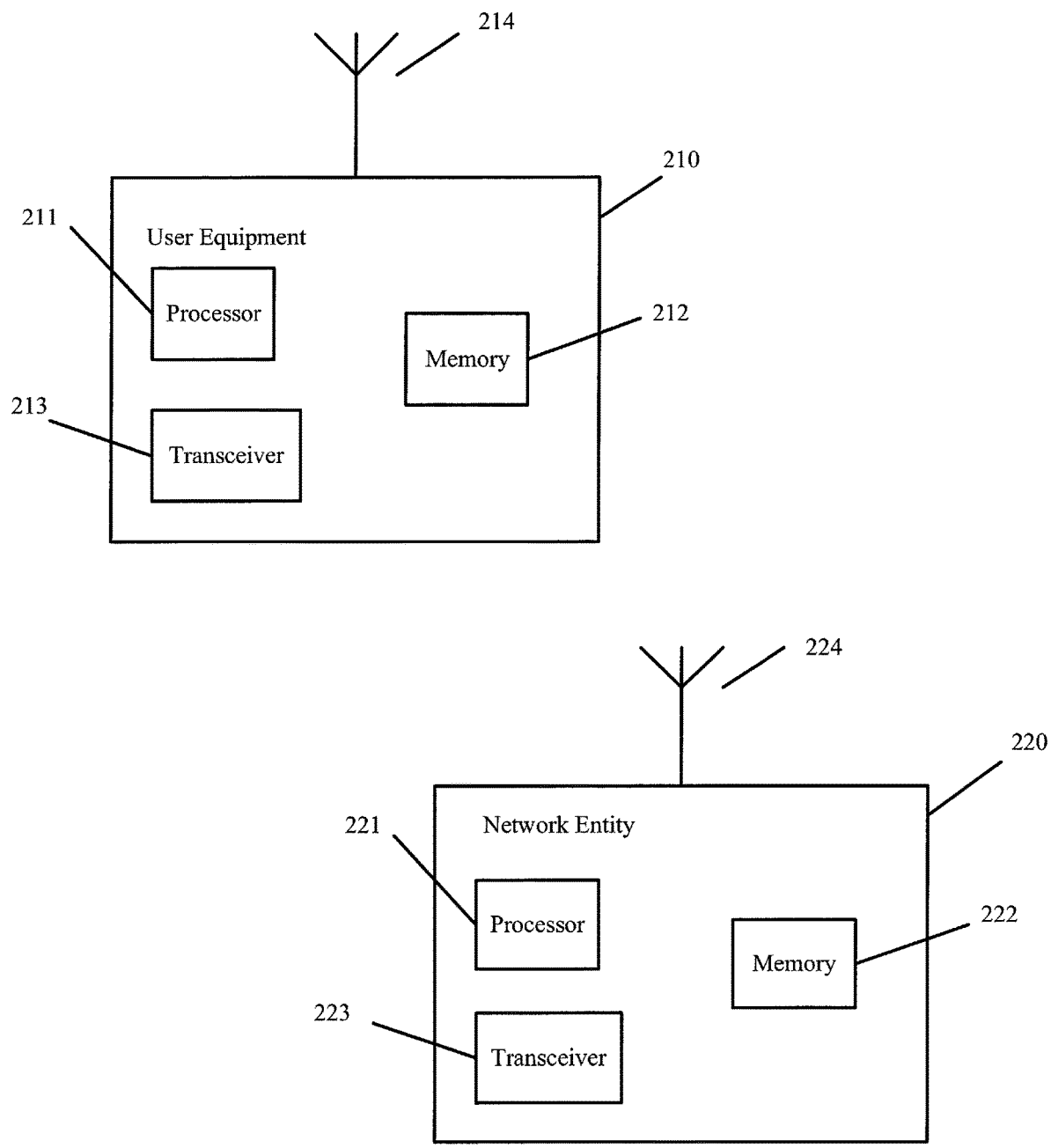
FIG. 2 illustrates an example of a system according to certain embodiments.

FIG. 2 illustrates a system according to certain embodiments. It should be understood that each table, signal, or block in FIG. 1 may be implemented by various means or their combinations, such as hardware, software, firmware, one or more processors and/or circuitry. In one embodiment, a system may include several devices, such as, for example, network entity 220 or UE 210. The system may include more than one UE 210 and more than one network entity 220. Network entity 220 may be a base station, an access point, an access node, an enhanced NodeB (eNB), a 5G or New Radio NodeB, a server, a host, or any other network entity that may communicate with the UE.

Each of these devices may include at least one processor or control unit or module, respectively indicated as 211 and 221. At least one memory may be provided in each device, and indicated as 212 and 222, respectively. The memory may include computer program instructions or computer code contained therein. One or more transceiver 213 and 223 may be provided, and each device may also include an antenna, respectively illustrated as 214 and 224. Although only one antenna each is shown, many antennas and multiple antenna elements may be provided to each of the devices. Other configurations of these devices, for example, may be provided. For example, network entity 220 and UE 210 may be additionally configured for wired communication, in addition to wireless communication, and in such a case antennas 214 and 224 may illustrate any form of communication hardware, without being limited to merely an antenna.

Transceivers 213 and 223 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network entity deliver local content. One or more functionalities may also be implemented as virtual application(s) in software that can run on a server.

A user device or UE 210 may be a mobile station (MS), such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network entity, may include means for carrying out embodiments described above in relation to FIG. 1. In certain embodiments, at least one memory including computer program code can be configured to, with the at least one processor, cause the apparatus at least to perform any of the processes described herein.

Processors 211 and 221 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 212 and 222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 220 or UE 210, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1 and 2. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Furthermore, although FIG. 2 illustrates a system including a network entity 220 and UE 210, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 210 may likewise be provided with a variety of configurations for communication other than communicating with network entity 620. For example, the UE 210 may be configured for device-to-device, machine-to-machine, or vehicle-to-vehicle communication.

The above embodiments provide for significant improvements to the functioning of a network and/or to the functioning of the network entities within the network, or the user equipment communicating with the network. For example, certain embodiments help the UE to build a PDU corresponding to a changed CE level. The above embodiments may help to minimize the amount of padding for Msg3 retransmission. This can help to reduce the amount of power used by the UE to transmit early data transmissions, thereby reducing the amount of resources used by the network entity to process the early data transmissions. The reduction in the amount of power used by the user equipment may help to preserve or extend the battery life of the user equipment. Certain embodiments may also help to build a MAC PDU that allows for the efficient exchange of early data transmission, even when the CE level changes.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to further enhanced Machine Type Communication, the above embodiments may apply to any other 3GPP technology or non-3GPP technology, such as IoT technology, LTE, LTE-advanced, fourth generation (4G) technology, and/or fifth generation (5G) technology, New Radio technology, or Carrier Aggregation technology.

PARTIAL GLOSSARY

3GPP Third Generation Partnership Project
LTE Long Term Evolution
LTE-A Long Term Evolution Advanced
NB-IoT Narrowband IoT
CE Coverage Enhancement
RSRP Reference Signal Received Power
RAR Random Access Response
Msg3 Message 3
PDU Protocol Data Unit
MAC Medium Access Control
SDU Service Data Unit

What is claimed is:

1. A method comprising:
   changing a coverage enhancement level in response to a failure of a random access procedure;
   determining that early data transmission is to be transmitted in the changed coverage enhancement level, wherein the changed coverage enhancement level corresponds to a new maximum transport block size;
   building at a user equipment a protocol data unit corresponding to the new maximum transport block size; and
   transmitting the early data from the user equipment to a network entity in the built protocol data unit on the changed coverage enhancement level.

2. The method according to claim 1, wherein the transmitting of the early data is a retransmission.

3. The method according to claim 1, further comprising:
   receiving at the user equipment the new maximum transport block size corresponding to the changed coverage enhancement level.

4. The method according to claim 1, further comprising:
   storing at the user equipment an initial protocol data unit in a transmit buffer, wherein the initial protocol data unit is for transmission by the user equipment to the network entity.

5. The method according to claim 4, further comprising:
   removing at least one of a padding or a padding sub-header from the stored initial protocol data unit to obtain a clean protocol data unit.

6. The method according to claim 1, further comprising:
   storing at the user equipment an initial service data unit and corresponding control elements in a transmit buffer, wherein the initial service data unit and the corresponding control elements are for transmission by the user equipment to the network entity, and wherein the building of the protocol data unit comprises adding one or more bytes to the initial service data unit and the corresponding control elements for padding or padding subheader.

7. The method according to claim 5, further comprising:
   comparing a length of the clean protocol data unit and the new maximum transport block size corresponding to the changed coverage enhancement level; and
   initiating the early data transmission when the clean protocol data unit is smaller than or equal to the new maximum transport block size corresponding to the changed coverage enhancement level.

8. The method according to claim 5, further comprising:
   transmitting the protocol data unit stored in the buffer after the random access procedure is complete when the clean protocol data unit is larger than the new maximum transport block size corresponding to the changed coverage enhancement level.

9. The method according to claim 5, further comprising:
   selecting at the user equipment a new transport block size for early data transmission that is equal to or smaller than the new maximum transport block size corresponding to the changed coverage enhancement level, and that is larger than or equal to the clean protocol data unit.

10. The method according to claim 1, wherein the transmitted early data is comprised in a message 3 transmission of the random access procedure.

11. The method according to claim 5, wherein the building of the protocol data unit comprises adding one or more bytes to the clean protocol data unit for padding or padding subheader.

12. An apparatus, comprising:
    at least one memory comprising computer program code;
    at least one processor, wherein the at least one memory and the computer program code are configured, with the at least one processor, to cause the apparatus at least to:
    change a coverage enhancement level in response to a failure of a random access procedure;
    determine that early data transmission is to be transmitted in the changed coverage enhancement level, wherein the changed coverage enhancement level corresponds to a new maximum transport block size;
    build a protocol data unit corresponding to the new maximum transport block size; and
    transmit the early data to a network entity in the built protocol data unit on the changed coverage enhanced level.

13. The apparatus according to claim 12, wherein the transmitting of the early data is a retransmission.

14. The apparatus according to claim 12, wherein the at least one memory and the computer program code are configured, with the at least one processor, to cause the apparatus at least to:
    receive the new maximum transport block size corresponding to the changed coverage enhancement level.

15. The apparatus according to claim 12, wherein the at least one memory and the computer program code are configured, with the at least one processor, to cause the apparatus at least to:
    store an initial protocol data unit in a transmit buffer, wherein the initial protocol data unit is for transmission by the user equipment to the network entity.

16. The apparatus according to claim 15, wherein the at least one memory and the computer program code are configured, with the at least one processor, to cause the apparatus at least to:
    remove at least one of a padding or a padding sub-header from the stored initial protocol data unit to obtain a clean protocol data unit.

17. The apparatus according to claim 12, wherein the at least one memory and the computer program code are configured, with the at least one processor, to cause the apparatus at least to:
    store an initial service data unit and corresponding control elements in a transmit buffer, wherein the initial service data unit and the corresponding control elements are for transmission to the network entity, and wherein the building of the protocol data unit comprises adding one or more bytes to the initial service data unit and the corresponding control elements for padding or padding subheader.

18. The apparatus according to claim 16, wherein the at least one memory and the computer program code are configured, with the at least one processor, to cause the apparatus at least to:
    compare a length of the clean protocol data unit and the new maximum transport block size corresponding to the changed coverage enhancement level; and
    initiate the early data transmission when the clean protocol data unit is smaller than or equal to the new maximum transport block size corresponding to the changed coverage enhancement level.

19. The apparatus according to claim 16, further comprising:
    transmit the protocol data unit stored in the buffer after the random access procedure is complete when the clean protocol data unit is larger than the new maximum transport block size corresponding to the changed coverage enhancement level.

20. The apparatus according to claim 16, wherein the clean protocol data unit is smaller than or equal to the new maximum transport block size of the changed coverage enhancement level.

21. The apparatus according to claim 16, wherein the at least one memory and the computer program code are configured, with the at least one processor, to cause the apparatus at least to:
   select a new transport block size for early data transmission that is equal to or smaller than the new maximum transport block size corresponding to the changed coverage enhancement level, and that is larger than or equal to the clean protocol data unit.

22. The apparatus according to claim 12, wherein the transmitted early data is comprised in a message 3 transmission of the random access procedure.

23. The apparatus according to claim 16, wherein the building of the protocol data unit comprises adding one or more bytes to the clean protocol data unit for padding or padding subheader.

\* \* \* \* \*